Aug. 19, 1958     T. ACOSTA     2,848,026
FRUIT JUICING APPARATUS

Filed July 16, 1956     3 Sheets-Sheet 1

Inventor
Tracy Acosta
by McCanna and Morsbach
Attorneys

Aug. 19, 1958 — T. ACOSTA — 2,848,026
FRUIT JUICING APPARATUS
Filed July 16, 1956 — 3 Sheets-Sheet 2

Inventor
Tracy Acosta
by McCanna and Morsbach
Attorneys

Aug. 19, 1958 T. ACOSTA 2,848,026
FRUIT JUICING APPARATUS
Filed July 16, 1956 3 Sheets-Sheet 3

Inventor
Tracy Acosta
by McCanna and Morsbach
Attorneys

United States Patent Office 2,848,026
Patented Aug. 19, 1958

2,848,026

FRUIT JUICING APPARATUS

Tracy Acosta, New Smyrna Beach, Fla.

Application July 16, 1956, Serial No. 598,023

12 Claims. (Cl. 146—3)

This invention relates to fruit juicing apparatuses and more particularly to an apparatus for centrifugally separating the fruit juices from the pulp, rag and seeds.

The apparatus of the present invention is generally useful for separating juice from pulp, rag and seeds and is particularly designed for use with a juice extracting machine of the type disclosed in the patent to Coffey, 2,642,106, wherein the fruit is automatically cut in half and the separate halves then reamed to separate the juice and pulp from the rind. In this juicing machine, the pulp including some rag and seeds, together with the juice is passed from the reamer to a presser wherein the pulp is pressed to facilitate extraction of the juice, the juice flowing from the presser through one outlet and the pulp, rag and seeds being removed and discharged intermittently from the presser through a different outlet. The presser, while effective to break the individual cells and extract most of the juice therefrom, did not remove all of the available juice from the pulp or that juice which adheres to the rag and seeds, with the result that some juice was wasted.

An important object of this invention is to provide an improved apparatus for efficiently and rapidly separating fruit juice from the pulp, rag and seeds.

Another object of this invention is to provide an apparatus particularly adapted for use in automatic juice vending and dispensing machines and arranged to receive a charge of pulp, rag, seeds and juice therefrom, which apparatus is operative to centrifugally filter the juice from the pulp, rag and seeds and thereafter automatically clean itself.

A further object of this invention is to provide a fruit juicing machine including a centrifugal separator for extracting juice from the pulp, rag and seeds and having a discharge opening in the periphery of the separator, together with a mechanism operative in timed relation to the operation of the juicing machine to open the closure for the discharge opening and permit discharge of the pulp, rag and seeds therefrom a predetermined time interval after a charge of pulp and juice is supplied to the separator from the juicing machine.

These, together with various ancillary objects and advantages of this invention will be more readily appreciated at the same becomes better understood by reference to the following detailed description when taken in connection with the accompanying drawings wherein.

Figure 1:
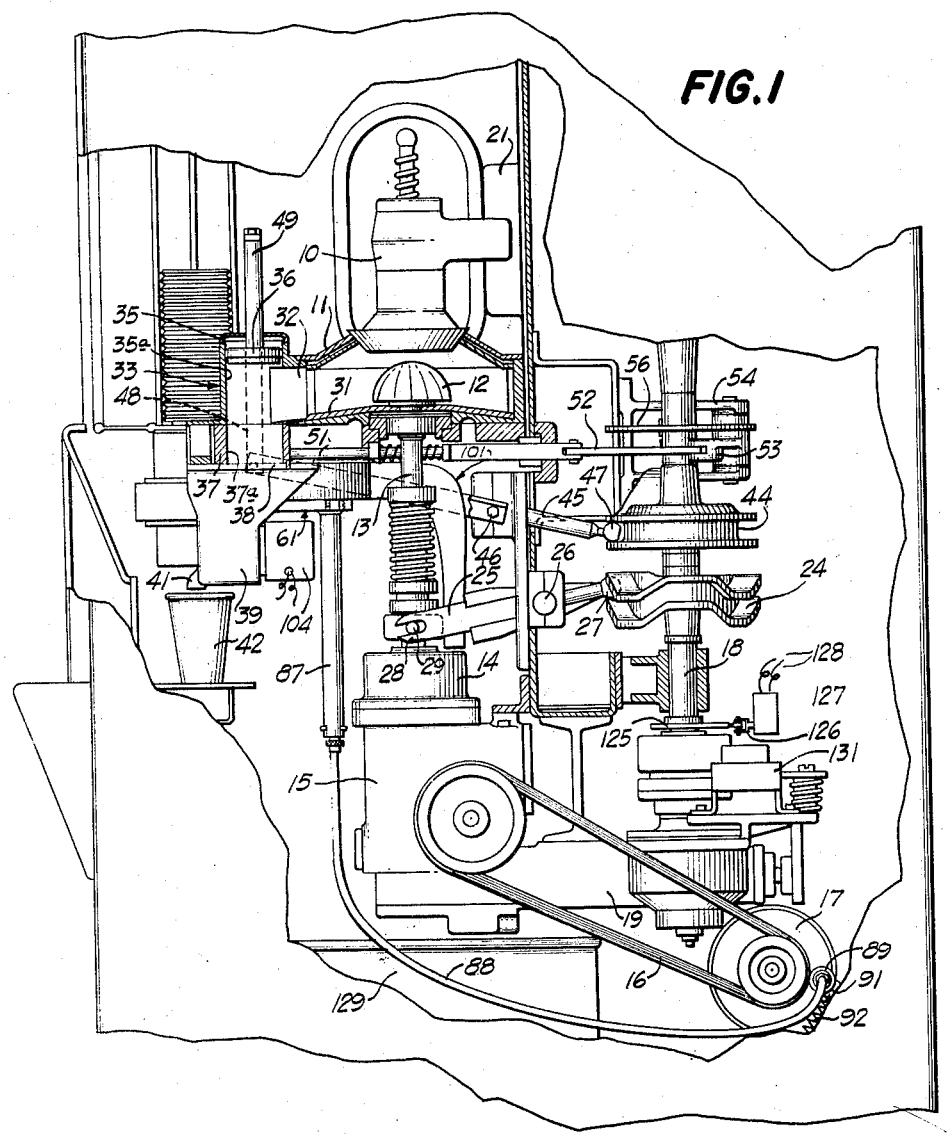
Figure 1 is a fragmentary side elevational view of the juicing machine with parts broken away and shown in section to illustrate details of construction.

The fruit juicing machine, as more fully disclosed in the aforementioned patent to Coffey, is arranged to feed a whole fruit from a hopper (not shown) to a pair of food gripping elements 10, one of which is illustrated in the drawings. The fruit is automatically halved, while retained by the gripping elements, and the gripping elements then moved by a suitable mechanism (not shown) to position the fruit halves within the reamer housing 11. A reamer 12 is disposed in the reamer housing and is rotatably connected through a shaft 13 and clutch 14 to a gear box 15 which is driven by a belt 16 from a prime mover 17. The reamer and gripping elements are operated in timed relation and for this purpose there is provided a cam shaft 18 driven through a take-off 19 from the gear box 15 and which cam shaft is arranged to operate the respective instrumentalities through one complete cycle as the cam shaft is rotated through one revolution.

Each of the fruit gripping elements 10 is mounted on a hub 21 for rotation about a horizontal axis and are oscillated about this axis by means of a suitable connection to the cam shaft 18 (not shown). The reamer 12 is arranged to be elevated to ream the fruit held by the gripping element 10 and thereafter lowered and for this purpose there is provided a barrel cam 24 on the cam shaft 18. A link 25 is pivoted intermediate its ends at 26 and has a follower 27 on one end engageable with the barrel cam and a bifurcated portion 28 on the other end engageable with pins 29 on the reamer shaft 13 to raise and lower the reamer as the cam shaft rotates.

The clutch mechanism 14 is preferably arranged to be responsive to raising and lowering of the reamer shaft to drivingly connect the reamer to the output shaft of the gear box 15, and advantageously may be arranged so that the reamer 12 is driven at a relatively low speed of the order of 300 R. P. M. as it is raised to ream the fruit and then driven at a relatively higher speed of the order of 1800 R. P. M. when it is lowered, to more efficiently remove the juice and pulp from the reamer. A rotary plate 31 is also mounted on the shaft 13 for rotation therewith and facilitates conveying the pulp, rag, seeds and juice to the discharge opening 32 in the reamer housing to a juice extracting press 33. For convenience, the term pulp is hereinafter used to describe the solids separated from the fruit skin and includes the juice cells together with any rag and seeds which are separated from the fruit skin.

The juice extraction press 33 includes a stationary housing 35 having a bore 35a which communicates with the discharge opening of the reamer housing. A plunger 36 is slidably disposed in the bore 35a and normally positioned as shown in Fig. 1 above the discharge opening 32 in the reamer housing. A scraper 37 is mounted at the lower end of the housing 35 and has a bore 37a therein which is normally aligned with the bore 35a in the housing. A grid 38 is affixed to the housing 35 below the scraper 37 and communicates with a funnel or hopper 39 having a discharge spout 41 through which the juice is discharged into a suitable receptacle 42. The plunger is operated in timed relation with the reamer to press the pulp against the grid and extract the juice therefrom and for this purpose there is provided a barrel cam 44 on the cam shaft 18. An arm 45 is pivotally mounted intermediate its ends at 46 and has a follower 47 at one end engageable with the barrel cam. A link 48 is attached to the other end of the arm 45 and to the piston rod 49 on the plunger 36 to raise and lower the latter as the cam 44 rotates. Preferably, the cam is arranged to effect lowering of the plunger after the completion of the reaming operation.

Figure 2:
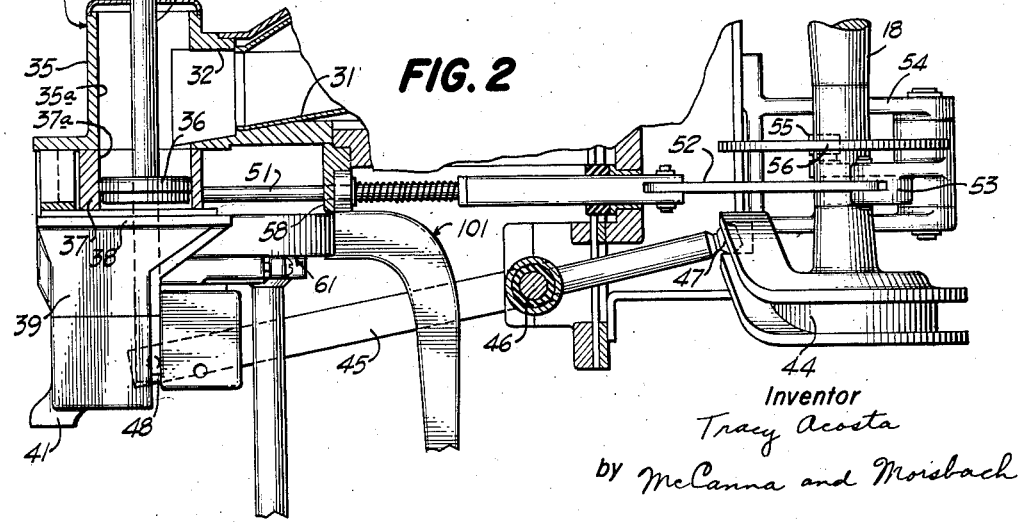
Fig. 2 is an enlarged fragmentary view of the pressing mechanism and the operating mechanism therefor, with parts broken away and shown in section to illustrate details of construction.

The scraper 37 is operated to remove the pulp from the grid and also from the plunger 36 after the completion of the pressing operation. As shown in Figs. 1 and 2, the lower movable section or scraper is connected through a rod 51 and link 52 to one end of a rocker arm 53 which is pivotally mounted on a bracket 54. A roller 55 is mounted on the other end of the rocker arm 53 and engages a cam 56 on the cam shaft 18. The cam 56 is designed to normally maintain the scraper 37 in a position such that its bore 37a is aligned with the bore 35a in the housing. A well portion is formed in the cam and arranged to effect movement of the scraper 37 crosswise of the bore to scrape the pulp from the grid 38 and discharge the pulp at a pulp discharge opening 58 disposed at one side of the grid. Preferably, the barrel cam 44 and the cam 56 are so designed that the cam 44 effects lowering of the plunger to press the pulp and then raises the plunger to an intermediate position shown in Fig. 4 in which the underside of the plunger is disposed coplanar with the upper face of the scraper 37. At this time, the cam 56 operates to move the scraper crosswise of the plunger and across the grid 38 so as to thereby scrape the pulp from the grid and from the underside of the plunger. The barrel cam 44 then operates to further raise the plunger 36 to its initial position shown in Fig. 1 wherein the press is ready to receive an additional quantity of pulp and juice.

The mechanism thus far described is more completely disclosed in the aforementioned patent to Coffey and accordingly further description is deemed unnecessary. The centrifugal separator, indicated generally by the numeral 61, is arranged to receive pulp discharged from the juice extraction press through the pulp discharge opening 58 and to centrifugally remove the juice remaining in the pulp and discharge the juice back into the hopper 39.

Figure 4:
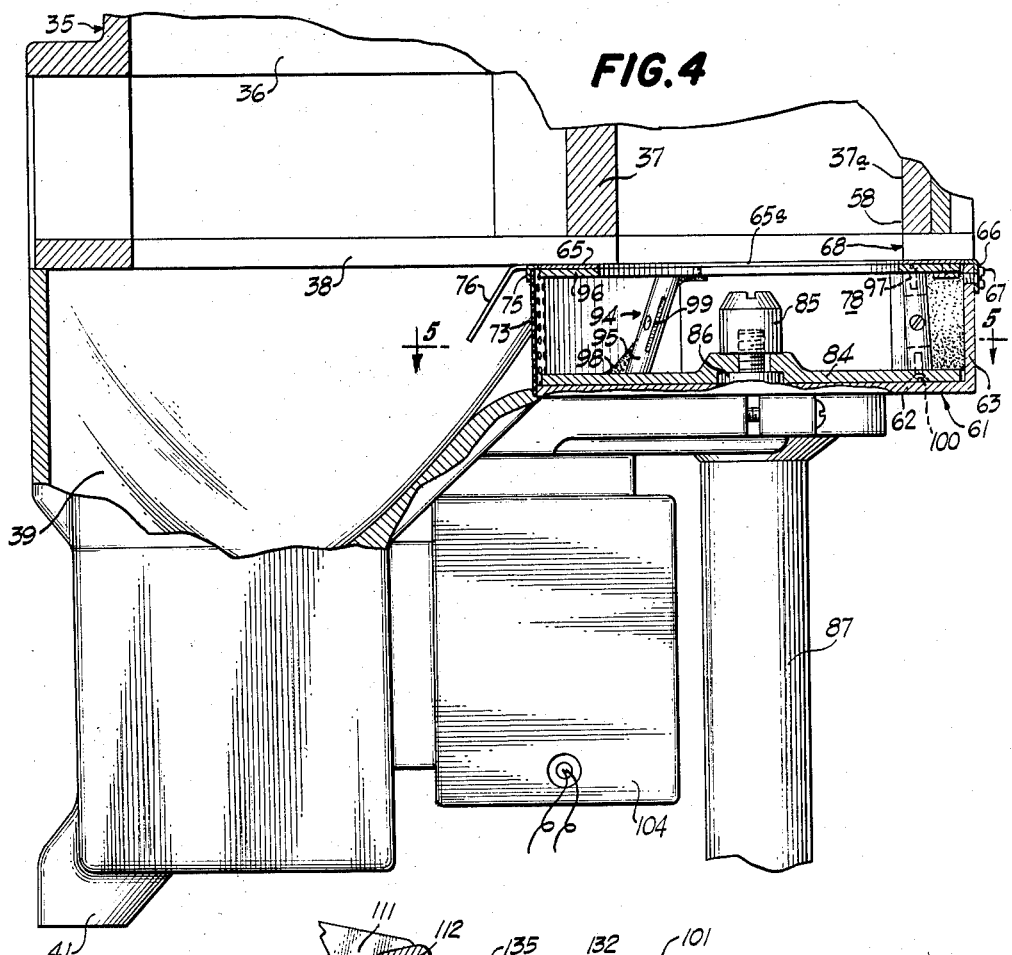
Fig. 4 is a side elevational view of the separator with parts broken away along the line 4—4 of Fig. 3 to illustrate constructional details.
Figure 5:
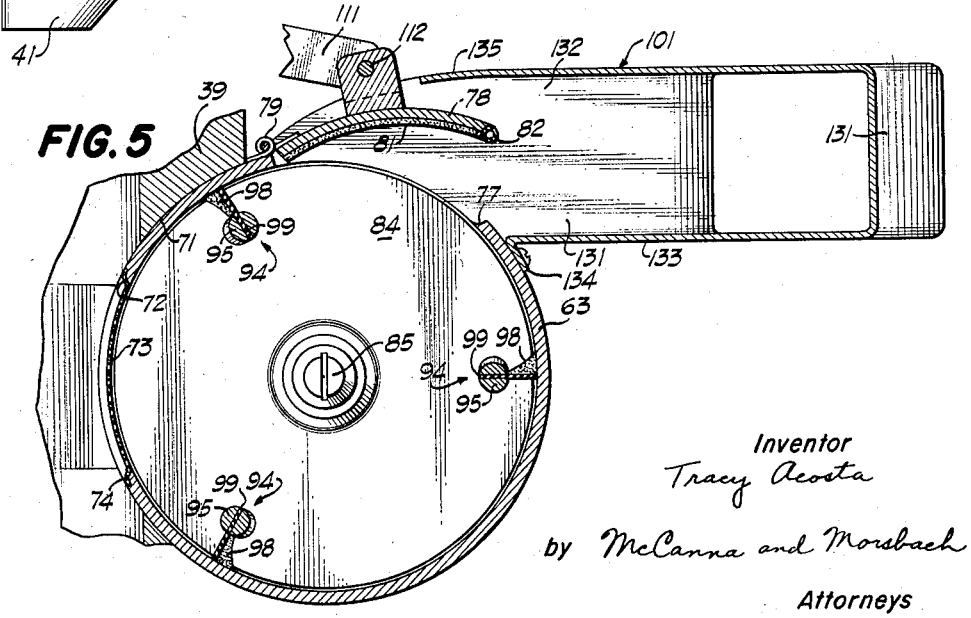
Fig. 5 is a fragmentary horizontal sectional view through the centrifuge taken on the plane 5—5 of Fig. 4.

The centrifugal separator 61 includes a housing having a bottom 62 and an annular peripheral side wall 63 extending upwardly from the bottom. An annular rim 65 having a plurality of depending tabs 66 is disposed on the upper end of the side walls and affixed thereto as by fasteners 67. A semi-circular band 68 is interposed between the rim 65 and the bottom of the fruit press housing 35, which band opens at the side adjacent the hopper 39 to permit the scraper 37 to move into and out of a position overlying the pulp discharge opening 58. As best shown in Fig. 4, the rim 65 on the centrifugal separator housing defines an annular opening 65a which registers with the pulp discharge opening 58 in the fruit press housing so that the pulp discharged from the presser is fed axially into the separator housing. The separator housing is mounted at one side of the juice hopper 39 and extends partially through an opening 71 formed in the side wall of the hopper. A juice outlet opening 72 is formed in the portion of the side wall 63 of the separator housing which extends into the hopper and a perforate screen 73 is positioned to overlie the opening in the side wall. As best shown in Fig. 5, the screen 73 is disposed so that the inner face thereof forms a continuation of the inner side of the side wall 63 and the end portions of the screen are offset at 74 to overlie the outer edge of the side wall. A depending lip 75 (Fig. 4) is formed on the rim 65 and engages the outer side of the screen 73 to retain the latter in position at the discharge opening. A baffle plate 76 is mounted on the hopper to deflect the juice passing through screen 73 downwardly in the hopper away from the grid 38 and to also deflect the juice from the press 33 away from the screen 73 in the centrifugal separator.

A pulp discharge opening 77 is formed in the side wall 63 of the separator housing at a point circumferentially spaced from the screen 73 and an arcuate closure or door 78 is hingedly connected to the side wall 63 by a hinge 79 for movement into and out of position closing the pulp discharge outlet 77. Gaskets 81 and 82 are positioned along the sides and end respectively of the door 78 to seal the outlet 77 when the door is in its closed position. The gaskets may be conveniently formed of resilient tubular material and grooves 80 are formed in the separator housing along the top and bottom of the outlet opening 77 for the reception of the gaskets 81.

A rotor is disposed within the housing and includes a bottom plate 84 which overlies the bottom 62 of the housing and extends into closely spaced adjacency to the side walls 63. The rotor is non-rotatably attached by means of a hub 85 to the rotor drive shaft 86, which shaft is rotatably mounted in a tube 87 and arranged for connection at its other end to a flexible drive shaft 88. The latter is connected to a roller 89 mounted on an arm 91 and yieldably urged into engagement with the drive belt 16 of the motor 17 as by a spring 92 to thereby frictionally drive the rotor whenever the motor is in operation.

A plurality of vanes 94 are mounted on the bottom plate 84 and extend upwardly therefrom. Preferably, the vanes are in the form of a plurality of posts 95, attached to the bottom plate by fasteners 100 and attached at their upper ends to an annular ring 96 by fasteners 97. The posts are inclined upwardly in the direction of rotation of the rotor and a resilient wiper 98 is attached to the post, as by being inserted in a slot 99 therein and extends outwardly from the post into wiping engagement with the side walls 63. The vanes engage the pulp fed into the housing through the open top thereof and impart rotary motion to the pulp. As the pulp and juice are moved by the screen 73, at high speed, the juice passes through the screen into the hopper 39 and the pulp remains in the separator housing. As is apparent, the vanes wipe the screen and inner walls of the housing to maintain the latter substantially clean.

Figure 3:
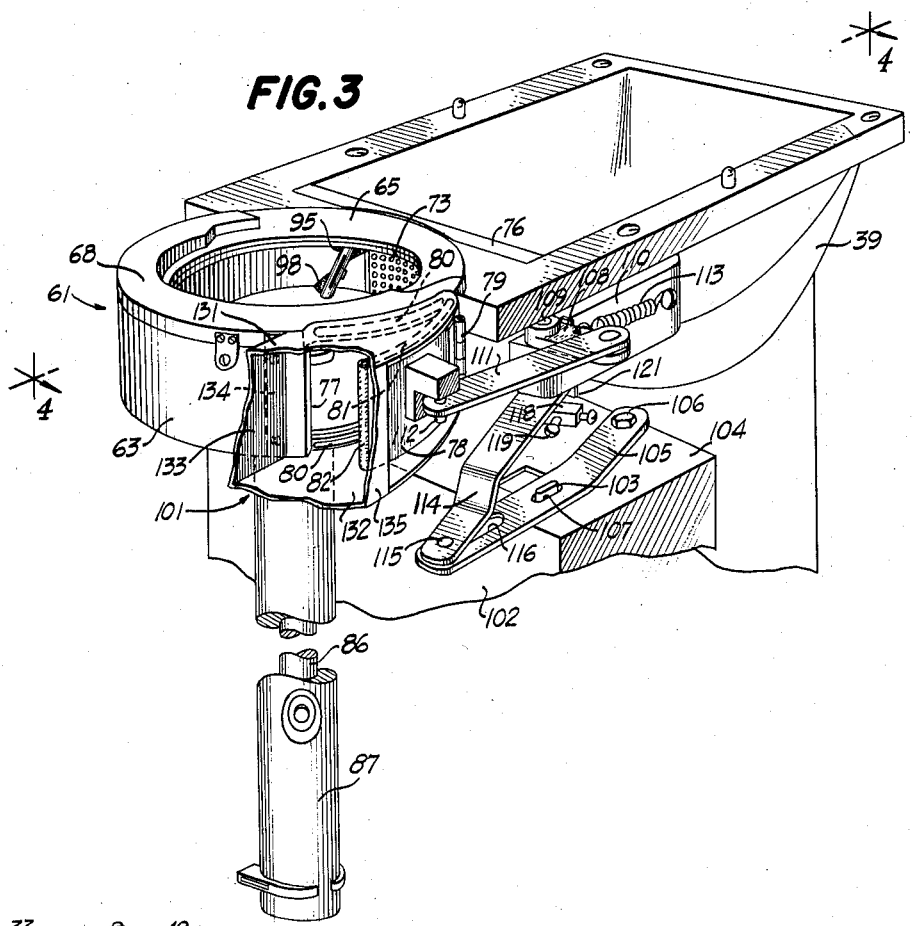
Fig. 3 is a perspective view of the centrifugal separator.

Provision is made for opening the door 78, after substantially all of the juice has passed from the separator through the screen, to permit the pulp to pass from the separator through the opening 77 into the discharge chute 101. The mechanism for opening the door 78 is best shown in Fig. 3 and includes a solenoid 102 mounted at one side of the hopper 39 below the separator housing, which solenoid has an armature 103 extending through an opening in the casing 104 thereof. An arm 105 is mounted by a pin 106 on the solenoid housing and has a slot 107 formed intermediate the ends thereof for receiving the solenoid armature 103. A crank 108 is pivoted on a pin 109 carried by a bracket 110 at one side of the hopper 39. A link 111 is provided to pivotally interconnect the crank 108 to the pin 112 carried by the door 78 whereby the door is opened and closed in response to swinging movement of the crank 108. A spring 113 is attached to the crank 108 and arranged to normally maintain the door in its open position. The pin 109 is connected by means of a link 114 to the arm 105. A pin 115 is affixed to one end of the link 114 and extends through a slot 116 in the arm to effect pivotal movement of the link 114 about the axis of the pin 109 in response to swinging movement of the arm 105. The other end of the link 114 is operatively connected to the pin 109 to oscillate the latter therewith and is preferably mounted for limited angular adjustment with respect to the pin to permit adjustment of the open and closed positions of the door 78. For this purpose, the link 114 is loosely mounted on the pin 109. A bracket 118 is non-rotatably attached to the end of the pin 109 and carries an adjusting screw 119 at a point radially offset from the center of the pin and which is engageable with a depending lip 121 on the link 114 to adjust the angular position of the pin with respect to the link in response to adjustment of the screw 119. Thus, when the solenoid is energized, the armature is moved in a direction to pivot the arm 105 in a clockwise direction as viewed in Fig. 3. This causes the link 114 to swing in a clockwise direction, which link acting through pin 109, crank 108 and link 111 moves the door 78 to its closed position. When the solenoid is de-energized the spring draws the door to its open position and permits the pulp in the separator housing to be discharged through the opening 77.

The solenoid 104 is energized and de-energized in timed relation with the operation of the other instrumentalities of the juicing machine by means of a cam 125 on the cam shaft 18. As best shown in Fig. 1, the cam 125 engages the follower 126 of a switch 127, which switch is operatively connected in series with the solenoid 104 to a source of power by means of conductors 128. The cam 125 is arranged to normally maintain the solenoid energized and to de-energize the solenoid a predetermined interval after the scraper of the presser mechanism is operated to discharge the pulp from the pressing mechanism into the centrifugal separator. The vanes 98 which are disposed in wiping contact with the walls of the separator housing maintain the latter clean and, when the door 78 is opened, effect discharge of the pulp from the separator.

The waste chute 101 is arranged to extend adjacent the opening 78 to receive the pulp discharged therefrom and convey the pulp to a suitable receptacle 129 adjacent the bottom of the machine. The waste chute is generally L-shaped in configuration and has one end thereof shaped for attachment to the separator housing. As best shown in Figs. 3 and 5, the upper end of the waste chute extends substantially tangentially of the separator housing adjacent the outlet opening 77 and has top and bottom walls 131 and 132 respectively arranged to overlie and underlie the door 78 when the latter is open. The top and bottom walls of the chute extend into engagement with the housing to prevent the passage of pulp. One of the side walls 133 of the chute has an attachment flange 134 formed thereon and which is secured to the side wall 63 of the separator housing. The other side wall 135 of the chute extends to a point beyond the free end of the door 78 and spaced from the hinged end thereof to provide clearance for the linkage 111. The chute 101 curves downwardly from the upper end and terminates above the waste receptacle 129, as is clearly shown in Fig. 1. A flexible sheath (not shown) may be affixed to the lower end of the chute to extend downwardly into the receptacle to prevent splashing.

*Operation*

As disclosed in the patent to Coffey, the filling machine is conveniently coin controlled and arranged so that the motor 17 is energized in response to insertion of a coin into the machine. Starting of the motor 17 causes the cam shaft 18 to rotate and also drives the rotor of the centrifugal separator through the shaft 88. The gripping elements 10 are moved by suitable cams (not shown) on the upper end of the cam shaft to a position in which a whole fruit is fed to one of the gripping elements from a hopper (also not shown). The gripping elements are then moved into opposing registry so that the fruit is gripped by both elements and a cutter passed between the gripping elements to cut the fruit in half. The gripping elements are then moved so as to alternately position the fruit half section gripped thereby within the reamer housing 11. Cam 24 is arranged to move the reamer head 12 up and down to ream each of the fruit halves and, as the reamer head is moved upwardly, the clutch 14 is operated in response to the upward movement to connect the reamer shaft 13 to a power output shaft from the gear box 15 to rotate the latter at a preselected speed. As the reamer shaft is lowered, the clutch 14 is operated to effect a different driving connection with the reamer shaft and preferably rotate the latter at a relatively higher speed to effect discharge of the juice and pulp through the discharge opening 32 in the reamer housing.

Barrel cam 44 on the cam shaft is arranged to normally maintain the plunger 36 in its raised position and, after the completion of the reaming of both halves of the fruit, effects lowering of the plunger to compress the pulp against the grid 38 at the lower end of the housing 35. Cam 44 then operates to raise the plunger to an intermediate position shown in Fig. 4 wherein the underside of the plunger 36 is disposed substantially coplanar with the upper edge of the scraper 37. Cam 56 then operates through the rocker arm 53 to move the scraper horizontally from the position shown in Fig. 1 to the position shown in Fig. 4 to scrape the pulp from the grid 38 and from the underface of the plunger 36. As is apparent from Fig. 4, the scraper overlies the open top of the centrifugal separator when the scraper is in its displaced position and the pulp therein is discharged into the separator. Cams 44 and 56 then operate to respectively raise the plunger to its raised position shown in Fig. 1 and return the scraper to its normal position, also shown in Fig. 1.

As previously described, the centrifugal separator is driven through the power take-off roller 89 and shaft 88 and consequently the pulp discharged into the separator is rotated at a relatively high speed. The juice remaining in the pulp passes through the perforate screen 73 into the hopper 39, the vanes 98 serving to wipe the pulp from the screen and maintain the latter clean. Cam 125 operates to close the switch 127 prior to the introduction of the pulp and juice into the separator and thereby energize the solenoid 104 to maintain the door 78 closed. A predetermined time interval after the completion of the pressing operation, and before the cam shaft has completed one revolution, cam 125 operates to open switch 128 and de-energize the solenoid 104. The door 78 is then opened by the spring 113 and, since the rotor 84 continues to rotate, the pulp in the centrifugal separator is discharged through the opening 77. A cam operated stop switch, designated generally by the numeral 131 is operated by the cam shaft at the completion of one revolution thereof to stop the motor 17 until the latter is again energized in response to insertion of a coin into the machine.

I claim:

1. A centrifugal juice extractor comprising a housing defining a rotor chamber having an annular side wall, said chamber having an inlet for introducing material containing solids and juice to be extracted, said chamber having a juice outlet and a solids outlet formed in said side wall and annularly spaced apart, means including a rotor in said chamber for rotating the material, said rotor having an open periphery and including a plurality of vanes extending into wiping contact with said side wall of the chamber, a screen overlying said juice opening to permit passage of juice therewith, a door on said housing for closing said solids outlet, means for intermittently introducing a charge of material through said inlet into said chamber, and means operated in timed relation with said last mentioned means for opening said door to permit ejection of the solids from said chamber after the juice has been extracted therefrom.

2. A centrifugal juice extractor comprising a housing defining a rotor chamber having an annular side wall, said chamber having an inlet for introducing the material containing solids and juice to be extracted, said chamber having a juice outlet and a solids outlet formed in said side wall, means including a rotor in said chamber for rotating said material therein, a screen overlying said juice outlet to permit passage of juice therethrough, a door overlying said solids outlet, means for periodically supplying a batch of material through said inlet to said chamber, and means operated in timed relation with said last mentioned means for opening said door to permit ejection of the solids from said chamber after the juice has been extracted therefrom.

3. A centrifugal juice extractor comprising a housing having a bottom wall and an upstanding annular side wall, a rotor having an open periphery disposed in said housing and overlying said bottom wall, means defining a passage communicating with the upper end of said housing for conveying material containing solids and juice to be extracted into said housing, said side wall having a perforate portion defining a juice outlet and an opening therein spaced annularly from said perforate portion and defining a solids outlet, a door for closing said solids outlet, said rotor having a plurality of resilient vanes mounted thereon and extending into wiping contact with said side wall and with said perforate portion to rotate said material in the housing and wipe the solids from said side wall and said perforate portion, means for intermittently introducing a charge of material through said passage into said housing, and means operated in timed relation with said last mentioned means for opening said door to permit ejection of the solids from said chamber after the juice has been extracted therefrom.

4. The combination of claim 3 wherein said door is arcuate and forms a continuation of said side wall when in its closed position, said door being hingedly connected to said side wall adjacent one edge of said opening and arranged to extend substantially tangentially of said side wall when in its open position.

5. A centrifugal juice extractor comprising a housing having a bottom wall and an upstanding annular side wall, a rotor disposed in said housing and including a bottom plate overlying said bottom wall and an annular top plate spaced from said bottom wall and defining a central inlet opening, means for supplying material containing solids and juice to be extracted through said inlet opening into said housing, a plurality of annularly spaced vanes extending between said top and bottom plates for rotating the material in said housing and for wiping the solids off from said side wall, said side wall having a perforate portion for discharging the juice from said housing and a solids discharge opening therein spaced annularly from said perforate portion, a door for closing said solids discharge opening, means for intermittently introducing a charge of material through said inlet opening into said housing, and means operated in timed relation with said last mentioned means for opening said door to permit ejection of the solids from said housing after the juice has been extracted therefrom.

6. A fruit juicing machine comprising fruit holding means, reaming means, reamer operating means for causing relative movement between said reaming means and said holding means to remove the pulp and juice from the fruit, a centrifugal separator, means for feeding pulp from the reaming means to a separator, said separator including a housing having a juice outlet opening therein, means in the housing for rotating the pulp and juice therein whereby the juice passes through said juice opening, cleaning means operable to discharge the pulp from said housing, and means operated in timed relation to said reamer operating means for operating said cleaning means to remove the pulp therefrom after the juice in the pulp has passed through said juice opening.

7. A fruit juicing machine comprising fruit holding means, reaming means, reamer operating means for causing relative movement between said reaming means and said holding means to remove the pulp and juice from the fruit, a juice extraction press including a housing having a juice outlet and a separate pulp outlet, means for feeding juice and pulp from said reaming means to said press housing, presser means in said housing operable to press the pulp whereby the juice passes through said juice outlet, means operable to remove the pulp from the press housing and discharge the pulp at said pulp outlet, a centrifugal separator including a housing positioned to receive the pulp discharged from said press, said separator housing having a juice outlet, means for rotating the pulp in said separator housing to cause the juice to pass through the juice outlet therein, means operable to discharge the pulp from said separator housing, and means for operating said reamer operating means; said presser means; said means for removing pulp from the press housing; and said means for discharging pulp from the separator, in timed relation to sequentially ream the fruit, press the pulp, clean the pulp from the press, centrifugally separate the juice from the pulp discharged from the press and finally discharge the pulp from the separator.

8. A fruit juice machine comprising reaming means for removing the pulp and juice from a piece of fruit, pressing means having a juice outlet and a pulp outlet, means for feeding the pulp and juice from said reaming means to said pressing means, a centrifugal extractor for removing the juice from said pulp including a housing defining a rotor chamber having an annular side wall, said housing having an opening communicating with said pulp outlet of the pressing means, a rotor in said chamber for rotating the pulp therein, said side wall having a perforate portion therein for passing juice from said chamber, means for passing the juice from said perforate portion to the juice outlet of said pressing means, said side wall having an opening spaced from said perforate portion, a door for closing said opening and means for operating said reaming means, said pressing means and said door in predetermined time sequence.

9. A fruit juice machine comprising reaming means for removing the pulp and juice from a piece of fruit, pressing means including a pressing chamber, means for feeding the pulp and juice from the reaming means to the pressing chamber, said pressing chamber having a juice outlet and a pulp outlet laterally offset from the juice outlet, a plunger in said pressing chamber movable in one direction to compress the pulp, cleaning means movable in a direction transverse the direction of movement of said plunger for removing the pulp from said pressing chamber and discharging the pulp through said pulp outlet, a centrifugal extractor located below said pulp outlet and including a housing defining a rotor chamber communicating with said pulp outlet, said housing including an annular side wall having a juice opening therein and a pulp opening therein, a screen overlying said juice opening, a door for closing said pulp opening, a rotor in said extractor housing for rotating the pulp therein, means for driving said rotor, means for operating said reaming means, said plunger, and said cleaning means in predetermined time sequence, and means for opening said door a predetermined time interval after the operation of said cleaning means.

10. A fruit juice machine comprising reaming means for removing the pulp and juice from a piece of fruit, pressing means including a pressing chamber, means for feeding the pulp and juice from said reaming means to the pressing chamber, a hopper below said pressing chamber for receiving the juice therefrom, means operable to press the pulp in said chamber, a pulp outlet horizontally offset from said hopper, a cleaning member mounted for horizontal reciprocation and operable to remove the pulp from said pressing chamber and to discharge the pulp through said pulp outlet, a centrifugal extractor including a housing defining a rotor chamber mounted below said pulp outlet, said housing having an upstanding annular side wall and a perforate portion in said side wall communicating with said hopper, said side wall having a pulp discharge opening spaced from said perforate portion, a door closing said opening, and means for operating said reaming means, said pressing means and said cleaning member in timed relation, and means for opening said door a preselected time interval after the operation of said cleaning member.

11. The combination of claim 10 including a baffle plate in said hopper overlying said perforate portion of the rotor chamber to deflect the juice from said presser away from said perforate portion and to deflect the juice from said centrifugal extractor downwardly away from said pressing means.

12. A fruit juicing machine comprising fruit holding means, reaming means, reamer operating means for causing relative movement between said holding means and said reaming means to remove the pulp and juice from the fruit, a separator including a housing having a juice outlet opening therein, means for feeding pulp from the reaming means to said separator, means in said housing for rotating the pulp therein whereby the juice passes through said juice opening, said housing having a solids discharge opening spaced from said juice opening, a door for closing said solids opening, and means operated in timed relation to said reamer operating means for opening said door to permit ejection of the solids from said housing after the juice has been extracted therefrom.

References Cited in the file of this patent

UNITED STATES PATENTS

| | | |
|---|---|---|
| 890,079 | Maggini | June 9, 1908 |
| 1,000,086 | Goetz et al. | Aug. 8, 1911 |
| 1,525,449 | Johnson | Feb. 10, 1925 |
| 2,642,106 | Coffey et al. | June 16, 1953 |
| 2,777,158 | Pitts et al. | Jan. 15, 1957 |